(12) United States Patent
Kilian et al.

(10) Patent No.: US 9,075,851 B2
(45) Date of Patent: Jul. 7, 2015

(54) METHOD AND APPARATUS FOR DATA RETENTION IN A STORAGE SYSTEM

(75) Inventors: Michael Kilian, Harvard, MA (US); Mark Avery, Weston, MA (US); Stephen Todd, Shrewsbury, MA (US); Tom Teugels, Schoten (BE); Francis Martens, Berchem (BE); Jan Bruyndonckx, Mechelen (BE)

(73) Assignee: EMC Corporation, Hopkinton, MA (US)

(*) Notice: Subject to any disclaimer, the term of this patent is extended or adjusted under 35 U.S.C. 154(b) by 441 days.

(21) Appl. No.: 10/731,790

(22) Filed: Dec. 9, 2003

(65) Prior Publication Data
US 2005/0125411 A1 Jun. 9, 2005

(51) Int. Cl.
*G06F 17/30* (2006.01)

(52) U.S. Cl.
CPC .............................. *G06F 17/30551* (2013.01)

(58) Field of Classification Search
USPC .............. 711/159; 705/11; 707/101, 200, 205
See application file for complete search history.

(56) References Cited

U.S. PATENT DOCUMENTS

| | | | | |
|---|---|---|---|---|
| 5,107,419 A * | 4/1992 | MacPhail | ........................... | 707/9 |
| 5,689,699 A | 11/1997 | Howell et al. | | |
| 5,813,009 A * | 9/1998 | Johnson et al. | ................ | 707/100 |
| 6,718,347 B1 * | 4/2004 | Wilson | ........................... | 707/201 |
| 6,807,632 B1 | 10/2004 | Carpentier et al. | | |
| 7,272,613 B2 * | 9/2007 | Sim et al. | ....................... | 707/102 |
| 7,281,084 B1 * | 10/2007 | Todd et al. | .................... | 707/202 |
| 7,287,047 B2 * | 10/2007 | Kavuri | ........................... | 707/204 |
| 2001/0034728 A1 * | 10/2001 | McBride et al. | .................. | 707/1 |
| 2002/0120667 A1 * | 8/2002 | Nakano | .......................... | 709/200 |
| 2004/0015713 A1 | 1/2004 | Abe et al. | | |
| 2004/0019500 A1 * | 1/2004 | Ruth | ................................. | 705/1 |
| 2004/0039594 A1 * | 2/2004 | Narasimhan et al. | ............. | 705/1 |
| 2004/0070622 A1 * | 4/2004 | Cossey et al. | .................. | 345/769 |
| 2004/0167898 A1 * | 8/2004 | Margolus et al. | ............... | 707/10 |
| 2005/0055518 A1 * | 3/2005 | Hochberg et al. | .............. | 711/159 |
| 2005/0055519 A1 * | 3/2005 | Stuart et al. | .................... | 711/159 |
| 2005/0060224 A1 * | 3/2005 | Ricketts | .......................... | 705/11 |
| 2005/0076042 A1 * | 4/2005 | Stakutis et al. | ................ | 707/100 |

(Continued)

FOREIGN PATENT DOCUMENTS

| | | | | |
|---|---|---|---|---|
| EP | 0 322 130 A3 | 6/1989 | | |
| EP | 0515073 | * 12/1992 | .............. | G06F 12/08 |
| EP | 0 881 580 A3 | 2/2002 | | |

(Continued)

OTHER PUBLICATIONS

LeBoef et al., "Effect of Sarbanes-Oxley on Document Retention Policies", May 30, 2003, p. 1-4.*

(Continued)

*Primary Examiner* — Khanh Pham
(74) *Attorney, Agent, or Firm* — Krishnendu Gupta; Joseph D'Angelo

(57) ABSTRACT

A system and method are provided for retention of data on a storage system. An application program provides the storage system with data to be stored on the storage system. The application program also provides the storage system with a retention period that indicates a period of time for which the data may not be deleted. When the storage system receives a request to delete the data, it first evaluates the retention period associated with that data to determine if the retention period has expired. If the retention period has not expired, the storage system denies the request to delete the data.

20 Claims, 3 Drawing Sheets

(56) References Cited

U.S. PATENT DOCUMENTS

| | | | |
|---|---|---|---|
| 2005/0097260 A1* | 5/2005 | McGovern et al. | 711/100 |
| 2006/0010150 A1* | 1/2006 | Shaath et al. | 707/102 |

FOREIGN PATENT DOCUMENTS

| | | | | |
|---|---|---|---|---|
| GB | 2379059 A | 2/2003 | | |
| JP | 5-159164 | 6/1993 | | |
| JP | 10-124351 | 5/1998 | | |
| JP | 11-306062 | 11/1999 | | |
| JP | 2001-356942 | 12/2001 | | |
| JP | 2002-024076 | 1/2002 | | |
| JP | 2002-366441 | 12/2002 | | |
| WO | WO 99/38093 | 7/1999 | | |
| WO | WO 01/18633 | 3/2001 | | |
| WO | WO0225445 | * | 3/2002 | G06F 17/30 |

OTHER PUBLICATIONS

Coyne et al., "The High Performance Storage System", Nov. 1993, ACM Press, p. 83-92.*

Santry et al., "Deciding when to forget in the Elephant file system", Dec. 1999, ACM Press, p. 110-123.*

Sipior, "The Dark Side of Employee Email", Jul. 1999, Communications of the ACM, vol. 42, No. 7, p. 88-95.*

Coyne et al., "HPSS Collaboration: Learn about HPSS", <http://www.hpss-collaboration.org/hpss/about/collaboration.jsp>, Retrieved Jul. 26, 2007, p. 1.*

Smith, "Long Term File Migration: Development and Evaluation of Algorithms", Aug. 1981, Communications of the ACM, vol. 24, No. 8, Pl. 521-532.*

OED.com, Entry for "storage device", 1989, Second Ed., Oxford University Press. <Retrieved from the web Jul. 29, 2008>.*

Wikipedia.org, entry for "Storage Device", Jul. 27, 2008, Wikipedia Foundation, <Retrieved from the web Jul. 29, 2008>.*

IEEE, The Authoritative Dictionary of IEEE Standards Terms, entry for "storage device", Dec. 2000, 7th Ed. p. 1113.*

Baird et al., "Distributed Information Storage Architecture", Apr. 1993, Mass Storage Systems, Putting All that Data to Work, Proceedings, Twelfth IEEE Symposium on Monterey, p. 145-155, <Retrieved from IEEE Explore Jan. 17, 2009>.*

Bedoll, "The Importance of metadata in mass-storage systems", May 1990, Mass Storage Systems, Crisis in Mass Storage, Tenth IEEE Symposium, p. 111-116, <Retrieved from IEEE Explore Jan. 17, 2009>.*

Lanzatella, "Storage Management Issues for Cray Research", May 1990, Mass Storage Systems, Tenth IEEE Symposium, p. 176-181, <Retrieved from IEEE Explore Jan. 17, 2009>.*

Foster et al, "Renaissance: managing the network computer and its storage requirements", Oct. 1991, Proceedings of the Symposium on Mass Storage Systems, p. 3-10, <Retrieved from IEEE Explore Jan. 17, 2009>.*

Search Report from Great Britain Patent Application No. GB 0426364.6.

Translation of Japanese Application No. 10-124351 provided with Great Britain Search Report.

Office Action from Indian Application 749/KOL/2004 dated Mar. 25, 2009.

Office Action from Japanese Application 2004-355471 dated Jun. 9, 2009.

* cited by examiner

METHOD AND APPARATUS FOR DATA RETENTION IN A STORAGE SYSTEM

BACKGROUND OF INVENTION

1. Field of Invention

The present invention relates generally to data storage and, more particularly, to a method and apparatus for data retention in a data storage system.

2. Discussion of Related Art

Businesses and other institutions, such as hospitals, schools, and government agencies, often use data storage systems to maintain records in electronic form. Such records may include, for example, company financial records, electronic mail (e-mail), patient medical records, student transcripts, and other types of data. It may be important to the business or institution to maintain these records in their original form for a certain period of time after their creation. That is, the business or institution may desire to prevent the records from being deleted or modified until a certain period of time has elapsed. For example, a hospital may wish to prevent modification or deletion of patient x-rays for a certain number of years after the x-rays are taken. Further, such retention of data may be mandated by law. For example, Securities and Exchange Commission (SEC) Rule 17a-4 requires that companies preserve certain financial records for a period of six years.

With conventional storage systems, users may accidentally delete or modify such records. Alternatively, malicious users may intentionally delete or modify such records, for example to conceal unscrupulous business practices or to dishonestly alter school transcripts. Whether accidental or intentional, such acts may cause an irreparable loss of data or even a violation of law. While some computer systems include a file system front end (often on a host computer rather than on a storage system) that allows files to be designated "read-only," an administrator of the system typically has the ability to change the "read-only" status of files such that the files may be modified or deleted. Further, conventional file systems do not allow the user to specify a period of time for which data cannot be deleted or modified. That is, designating a file "read-only" means that the file cannot be deleted or modified so long as the file's read-only status is not altered.

Some storage systems store data on recording media, e.g., optical discs (such as, CD-ROM discs) which cannot be overwritten or modified. However, such systems do not allow the user to specify a retention period, as once data is written to the media it can never be deleted from the media, although the media may be physically destroyed to prevent access to the data. Such media is not reusable if it is ever desired to replace the data on the media with new data.

SUMMARY OF INVENTION

One illustrative embodiment is directed to a method of processing data in a computer system comprising at least one host and at least one storage system. The method comprises acts of: (A) receiving a request, from the host, to delete a unit of data stored on the storage system; (B) determining whether a previously-defined retention period for the unit of data has expired; and (C) when it is determined in the act (B) that the retention period for the unit of data has not expired, denying the request to delete the unit of data. Another illustrative embodiment is directed to at least one computer readable medium encoded with instructions that, when executed on a computer system, performs the above-described method.

A further illustrative embodiment is directed to a storage system for use in a computer system comprising at least one host and the storage system. The storage system comprises: at least one storage device to store data received from the at least one host; and at least one controller. The at least one controller receives a request, from the host, to delete a unit of data stored on the storage system; determines whether a previously-defined retention period for the unit of data has expired; and when it is determined that the retention period for the unit of data has not expired, denies the request to delete the unit of data.

Another illustrative embodiment is directed to a storage system for use in a computer system comprising at least one host and the storage system. The storage system comprises at least one storage device to store data received from the at least one host; and at least one controller. The at least one controller receives at least one request, from the host, to store a unit of data in the storage system until at least the expiration of a retention period specified in the at least one request; stores the unit of data in the at least one storage device; and stores the information specifying the retention period in the at least one storage device.

A further illustrative embodiment is directed to a method of processing data in a computer system comprising at least one host and at least one storage system. The method comprises an act of: (A) transmitting at least one request, from the host to the storage system, requesting that the storage system store a data unit until at least the expiration of a retention period specified in the at least one request.

Another illustrative embodiment is directed to a method for use in a computer system comprising at least one host and at least one content addressable storage system that stores at least two different types of data units including blobs of data and content descriptor files (CDF) that correspond to the blobs, each CDF including metadata relating to the corresponding blob, each one of the blobs and CDFs being accessible to the at least one host computer using an identifier that is generated based on a content of the one of the blobs and CDFs. The method comprises an act of: (A) providing at least one piece of information in the identifier for each data unit to identify whether the identified data unit is a blob or a CDF.

A further illustrative embodiment is directed to a method of processing data in a computer system comprising at least one host and at least one content addressable storage system that stores at least two different types of data units including a blob of data and a content descriptor file (CDF) that corresponds to the blob and forms a blob/CDF set with the blob, the CDF including metadata relating to the corresponding blob, each one of the blobs and CDFs being accessible to the at least one host computer using an identifier that is generated based on a content of the one of the blobs and CDFs, wherein the storage system executes a garbage collection utility that deletes blobs but only after the corresponding CDF has been deleted so that the blob does not have a corresponding CDF. The method comprises an act of: providing the host with at least two options for deleting at least one of a blob and CDF in a blob/CDF set, the at least two options differing in terms of how much processing of the deletion is performed upfront in response to a deletion request and how much processing of the deletion is left for the garbage collection utility.

DETAILED DESCRIPTION

Various embodiments of the present invention are directed to methods and apparatus for use in a computer system that includes a storage system and a host computer that communicate to perform operations on data. For example, the storage system may store data (write) in response to a request from the host computer to store the data, return stored data (read) in response to a request from the host computer for the stored data, and delete stored data in response to a request from the host computer to delete the data.

In one embodiment of the invention, when sending a request to the storage system to store data, a host computer (defined herein as any computer capable of writing data to a storage system) may provide the storage system with the data to be stored and a retention period associated with the data to be stored. The retention period may, for example, define a period of time for which the data cannot be deleted or modified. The storage system may store the data and its associated retention period. If the storage system later receives a request from a host computer to delete or modify the data, the storage system may first evaluate the stored retention period associated with the data to determine if the retention period has expired. If the retention period has not expired, the storage system will not delete or modify the data. In this manner, once the retention period has been established for a unit of data, the storage system ensures that the unit of data is retained in an unmodified state for the full retention period.

Figure 1:
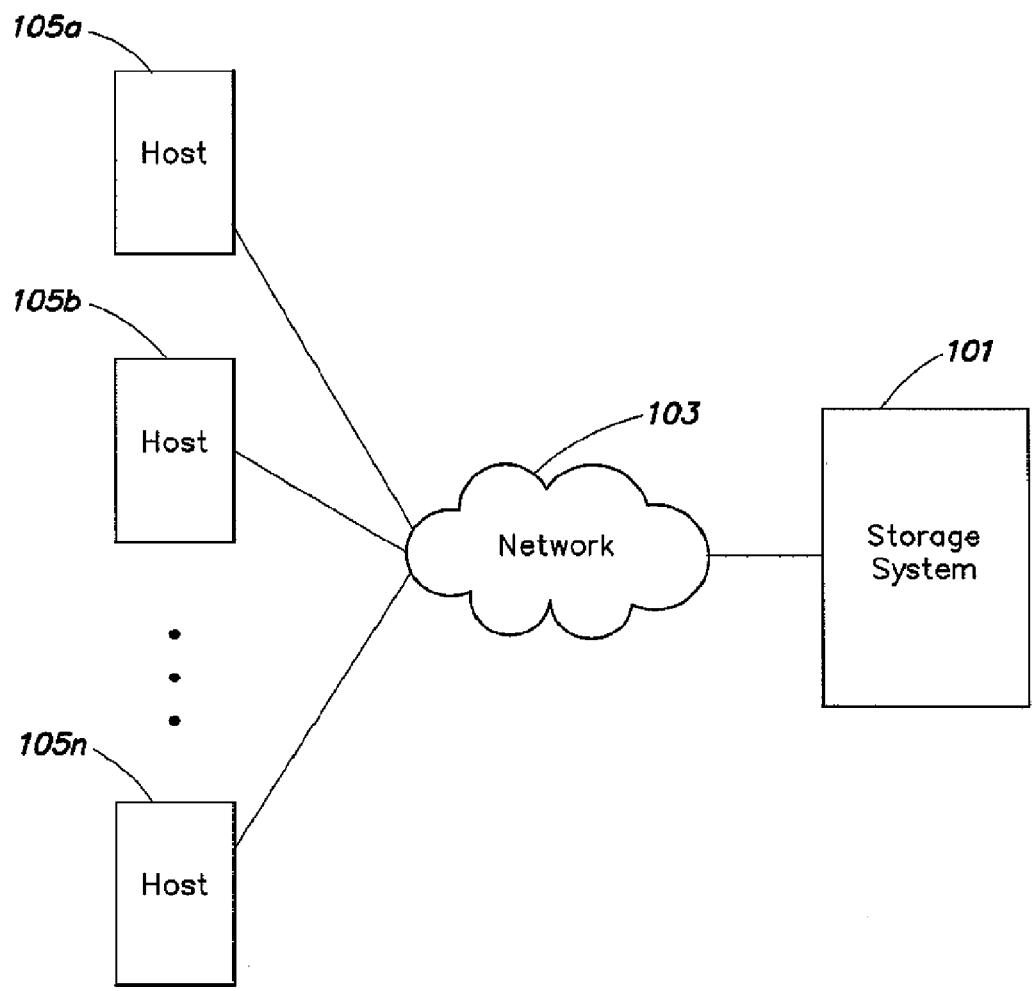
FIG. 1 is a block diagram of an exemplary computer system on which embodiments of the invention may be implemented.

An exemplary system on which various embodiments of the invention may be implemented is shown in FIG. 1. FIG. 1 shows a storage system 101 that communicates with a plurality of hosts 105a, 105b, . . . , 105n through a network 103. As used herein, a "network" (e.g., network 103) is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

Storage system 101 may include one or more storage devices (e.g., disks drives) to store applications, application data, user data, and the like in the computer system. Storage system 101 may be accessed by hosts 105 for the purposes of storing, retrieving, or performing operations on data stored on storage system 101. It should be appreciated that storage system 101 may be a device used primarily for data storage, or may be a device that performs a variety of other functions, such as executing user applications. That is, storage system 101 may be any device that is capable of storing and retrieving data.

Hosts 105 may be, for example, servers that provide resources (e.g., data storage, email, and other services), clients (e.g., general-purpose computer systems operated by users), network components (e.g., switches) or any other type of computer. Hosts 105 are coupled by network 103 to storage system 101 so that the hosts 105 can use the storage system 101 to store and retrieve data.

It should be appreciated that the storage configuration shown in FIG. 1 is only an example of the types of systems on which aspects of the present invention can be implemented, as the invention is not limited to use with any particular type of system configuration. For example, there need not be multiple hosts connected to a single storage system, and any of numerous other types of connection, (e.g., direct connections) can be used in addition to, or instead of, a network.

The Host 105 can access data on the storage system 101 in any of numerous ways, as the aspects of the present invention described herein are not limited to any particular type of system configuration. For example, in some computer systems, application programs executing on host 105 store information on files managed by a file system (e.g., executing on host 105). The file system maps the name of each particular file to one or more logical volumes and blocks of storage therein for storing the data within the file. The logical volumes may correspond directly to physical storage devices provided on the storage system 101, or when the storage system 101 is an intelligent storage system, the storage system may perform another layer of mapping between the logical volumes presented to hosts 105 and the actual physical storage devices within the storage system 101.

One embodiment of the present invention discussed below is adapted for use in a computer system of the type described in commonly assigned co-pending application Ser. No. 09/236,366, entitled "Content Addressable Information Encapsulation, Representation, and Transfer", filed Jan. 21, 1999, Ser. No. 09/235,146 entitled "Access to Content Addressable Data Over A Network", filed Jan. 21, 1999 and Ser. No. 09/391,360, entitled System and Method for Secure Storage, Transfer and Retrieval of Content Addressable Information, filed Sep. 7, 1999, each of which is incorporated herein by reference. These applications relate to content addressable storage (CAS) and are referred to collectively as "the CAS applications".

In a content addressable system, data is stored using a content address generated based upon the content of the data itself. The content address may be generated by applying a hash function to the data to be stored. The output of the hash function is the content address that may be used in communication between the host and storage system to refer to the data. The content address can be mapped (e.g., within the storage system 101) to one or more physical storage locations within the storage system. The use of content addressing is particularly well adapted to applications wherein the information stored does not change (i.e., fixed content data), such as numerous types of records such as those discussed above.

One example of a hash function that may be used to generate the content address is message digest 5 (MD5). The content address can correspond directly to the result of the hash of the content, or additional information can be added to the hash result to generate the address. In one embodiment, information describing whether the content being stored is host data or metadata associated with host data is added to the hash of the content to generate the content address. This additional information is useful in ways described below. It should be understood that any type of hash function may be used, as the aspects of the invention described herein are not limited to the use of any type of hash function, or even to use in a content addressable system.

When a host sends data to the storage system to be stored therein, both the host and the storage system may independently compute the content address of the data. The host may retain the content address for use in the future to retrieve the data from the storage system. Alternatively, when the host sends data to the storage system, only the storage system may compute the content address and return the computed content address to the host for later use in accessing the data. As yet another alternative, both the storage system and the host may compute the content address, and the storage system can return its generated the content address to the host. The host can compare its independently computed content address to the one received from the storage system to verify that they match.

Figure 2:
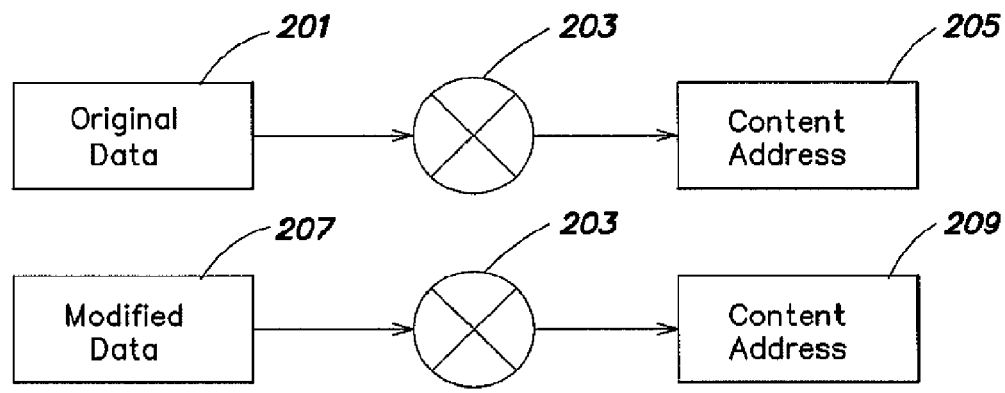
FIG. 2 is a diagram illustrating the generation of content addresses, in accordance with one embodiment of the invention.

As discussed above, for some types of fixed content data, such as patient x-rays or company financial records, it may be desired to retain the data in its original form, which means that modification of the data should not be allowed once the data has been stored on the storage system. In one embodiment of the invention for use with the above-referenced CAS applications, a characteristic of the content addressing system described in those applications is used to prevent modifications to previously written data. This characteristic is illustrated conceptually in FIG. 2, which illustrates that when a host stores original data 201 on a storage system, a content address 205 for the original data is generated by hashing function 203. The host may later retrieve a copy of the data from the storage system using content address 205. If the host seeks to modify the data and re-write it to the storage system as modified data 207, a new content address 209 is generated by hashing function 203 for the modified data. Because original data 201 and modified data 207 are different, hashing function 203 will generate different content addresses for data 201 and data 207. As a result, content addresses 205 and 209 will map to different physical locations on the storage device(s) of the storage system. Thus, when the host stores modified data 207 in the storage system, it is stored at a different location from original data 201 and does not overwrite the original data. Thus, original data 201 remains unmodified on the storage system.

It should be appreciated that the embodiment of the present invention that prevents modification of data once written is not limited to use with a content addressable system, as alternative techniques can be employed in systems using other types of addressing schemes to prevent modification of data previously written. For example, a host and/or file system may preclude writing to data previously written, and may require any modified data to be mapped to a different storage location.

Figure 3:
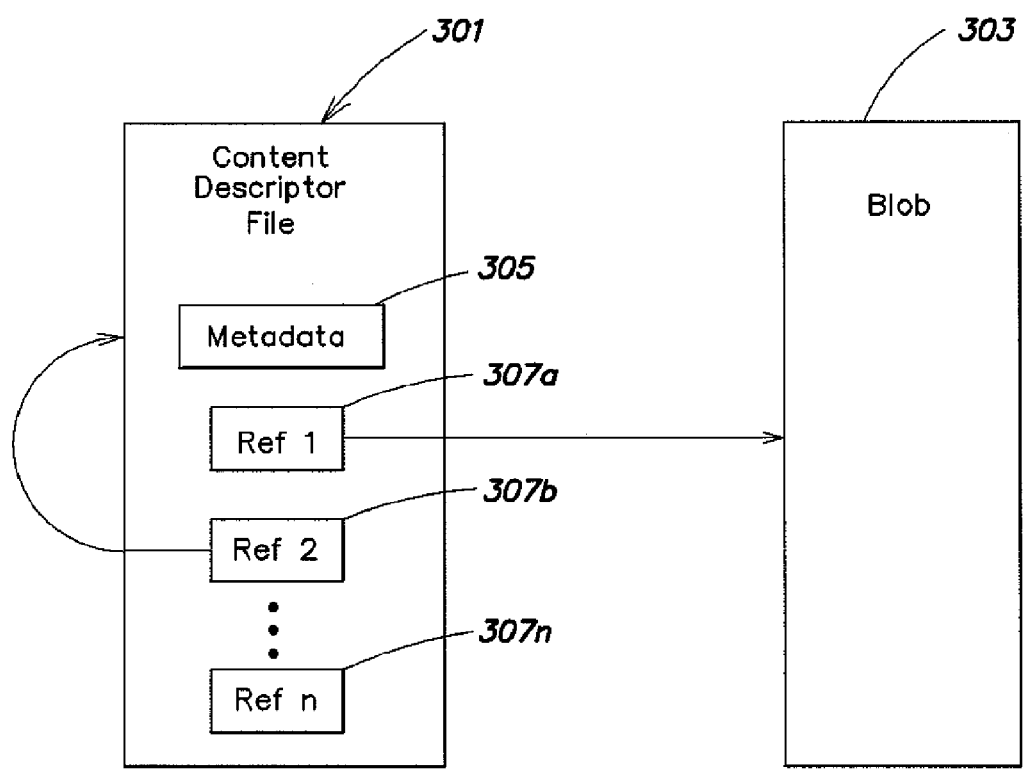
FIG. 3 is a block diagram illustrating an exemplary manner in which data may be stored on a storage system in accordance with one embodiment of the invention.

As mentioned above, in addition to preventing modification of data, it may also be desirable to prevent deletion of data before the expiration of a previously defined retention period. One embodiment of the invention is directed to techniques for ensuring that data cannot be deleted during a previously specified retention period. As discussed above, one embodiment of the present invention can be used in connection with the architecture described in the CAS applications. FIG. 3 illustrates the manner in which data is stored in accordance with the that architecture.

A unit of data in the architecture defined in the CAS applications is referred to as a blob (e.g., blob 303). Blob 303 may be, for example, the binary data to be stored by a host (e.g., host 105 in FIG. 1) on a storage system (e.g., storage system 105), such as, for example, a patient x-ray, company financial records, or any other type of data. When the blob 303 is stored to the content addressable storage system, a unique address is generated for the blob 303 based upon its content in the manner discussed above.

Each blob 303 has at least one content descriptor file (CDF) associated with it. CDF 301 may include metadata 305 and a plurality of references 307a, 307b, . . . , 307n. A CDF may reference one or more blobs or CDFs. Thus, the references 307 may be, for example, references to the blobs and/or CDFs referenced by CDF 301. Metadata 305 may, for example, include the creation date of CDF 301 (e.g., the date that CDF 301 was stored on the storage system) and a description of the content of blob 303. In accordance with one embodiment of the invention, the metadata further includes information specifying a retention period related to the associated blob 303. The retention period may be, for example, specified as a period of time from the creation date of blob 303 and/or CDF 301 during which blob 303 and CDF 301 may not be deleted. Thus, for example, if the retention period included in CDF 301 is two years, the storage system will not permit deletion of CDF 301 and blob 303 for two years from the creation date included in metadata 305 of CDF 301.

In accordance with one embodiment of the present invention, the retention period defined in the metadata 305 relates directly to the CDF 301, and only indirectly to the blob 303. This aspect of the present invention is adapted for use in a system architecture wherein a host cannot seek to directly delete a blob 303 (i.e., any such request is denied), but can only seek to delete a CDF 301, and wherein a garbage collection utility (described in more detail below) is employed on the storage system to clean up blobs that have been identified for deletion. A blob may be identified for deletion if there are no CDFs that reference it. In this respect, one aspect of that architecture is that a blob cannot be deleted so long as it is referenced by at least one CDF 301, but any blob that is not referenced by a CDF can be deleted.

It should be appreciated that the present invention is not limited to use in a system having the architecture described above, as many of the architectural features described above are merely implementation details. None is necessary to practicing the present invention. For example, rather than defining a retention period solely for a CDF, retention periods could alternatively be defined directly for a blob. If the blob itself carried a retention period, it would then be possible to allow host computers to directly delete blobs whose retention periods had expired.

The description of the blob 303 included in metadata 305 may include information describing the content of blob 303. For example, if blob 303 is an x-ray, metadata 305 may include information such as the patient's name, the data the x-ray was taken, additional doctor's notes regarding the x-ray or patient, or other information. It should be appreciated that the types of metadata given above are only examples of the types of metadata that may be included in metadata 305 of CDF 301. Indeed, any data related to blob 303 may be included in metadata 305, as the present invention is not limited in this respect.

CDF 301 may also include one or more references 307. These references may be, for example, references to blobs or other CDFs. For example, reference 307a may include the content address or file system location of blob 303, so that CDF 301 "points to" blob 303 through reference 307a. Hence, blob 303 may be accessed by a host using the content address or file system location of CDF 301, because reading the contents of CDF 301 provides the content addresses or file system location for blob 303. In the embodiment shown, CDF 301 also includes a reference 307b that "points to" itself, i.e., reference 307b includes the content address or file system location of CDF 301. This circular reference is provided to facilitate one embodiment of the garbage collection process described below in greater detail. However, the present invention is not limited to the use of that garbage collection process, or to the use of a circular reference in each CDF, as other implementations are possible. CDF 301 may include a plurality of other references that point to other CDFs or blobs, so that those CDFs or blobs may also be accessible using the content address of CDF 301.

In the example of FIG. 3, only one CDF (i.e., CDF 301) is shown "pointing to" blob 303. However, it should be appreciated that multiple CDFs may include references to the same blob. That is, two or more CDFs may "point to" the same blob. When multiple CDFs include references to the same blob, these multiple CDFs may include different metadata, including different creation dates and/or different retention periods. For example, one CDF that "points to" the blob may specify a retention period of two years from its creation date of Jul. 15, 2003, and a second may specify a retention period of three years from the same creation date. In accordance with one embodiment of the invention, the storage system may enforce the longest of the retention periods. Thus, on Jul. 15, 2005, the storage system will permit deletion of the first CDF, but will not permit deletion of the second CDF or the blob referenced thereby. However, on Jul. 15, 2006, the storage system will permit deletion of the first CDF (if not already deleted) and the second CDF, thereby allowing for garbage collection of the blob.

The embodiment of the present invention that employs the longest retention period specified for a blob does so to ensure that a user cannot circumvent an earlier-specified retention period by simply creating a new CDF for a blob that specifies a shorter retention period. The longest retention period for a blob is enforced in one embodiment of the invention by the above-described implementation wherein a blob cannot be deleted so long as it is referenced by any CDF. However, it should be appreciated that the aspect of the present invention that relates to enforcing the longest defined retention period is not limited to this implementation, as other techniques are possible.

When a host stores a blob on the storage system, it may provide the storage system with the blob and a CDF that is associated with the blob in a manner described in more detail below. The host may use the content address of the CDF to access the CDF, and thereby access the blob metadata and references included therein. The host may then use a blob reference (i.e., the content address or file system location of the blob) obtained from the CDF to access the blob (data) itself. Alternatively, after writing a blob, the host may retain the content address of the blob and use this content address to access the blob directly.

After a blob is created, one or more additional CDFs may be created that reference it. This may be done, for example, if it is desired to associate additional metadata with the blob, such as metadata to increase the retention period of the blob or add additional description information that is associated with the blob. Such additional CDFs may reference either the first CDF, the blob itself, or both.

In the example described above, the retention period was specified as a period of time in years from the creation date of the CDF. However, it should be understood that the retention period may be specified at a finer granularity. For example, the retention period may be specified in years, months, days, hours, minutes, seconds, or any combination of these (or any other) lengths of time. Further, the retention period need not be specified as a period of time from the creation date of the CDF. For example, the retention period may be specified as a date and/or time when the CDF and referenced blobs may be deleted. In one embodiment discussed in detail below, the retention period may be specified as a period of time from the occurrence of a specified event.

As discussed above, when a host creates a CDF for storage on the storage system, the host may specify a retention period which is included in the content of the CDF. The retention period may be specified as a period of time from the creation date of the CDF. In one embodiment, the storage system seeks to retain control over the retention period, to ensure that a host cannot delete data prior to expiration of the specified retention period. Thus, when a retention period is based upon a creation date for the CDF, it is desirable to base the creation data from a clock of the trusted storage system, to prevent a host from spoofing an incorrect creation date to bypass a retention period imposed on the data. For example, suppose on Sep. 15, 2003 a CDF is stored with a retention period of two years. Thus, the intended date of expiration of the CDF is Sep. 15, 2005. However, if the host spoofed a creation date timestamp of Sep. 15, 2002 into the CDF, the CDF would expire on Sep. 15, 2004, one year before the intended expiration date of the CDF. Therefore, in accordance with one embodiment of the invention, techniques are employed that allow the storage system to ensure that the creation date timestamp in the CDF is an accurate reflection of the actual creation date of the CDF. This can be done in any of numerous ways, as the aspects of the present invention directed to having the storage system verify the creation date for stored data is not limited to the particular implementations described below.

To ensure the accuracy of the creation date timestamp provided by the host, in one embodiment, the host is provided with an application programming interface (API) that interacts with the storage system to assist in ensuring the accuracy of the creation date for any data written to the storage system. In one embodiment, the host API communicates with the storage system to get the current time from the storage system (e.g., from the storage system's clock or any source trusted by the storage system), and compares the current time from the storage system's clock to the current time at the host (e.g., from the host's clock). From this comparison, the host determines a delta value indicating the difference in time between the storage system's clock and the host's clock. The information relating to the storage system's clock may be communicated to the host in any of numerous ways. In one embodiment, whenever the storage system sends a communication to the host, the current time from the storage system's clock is added onto the communication. Thus, each time the host receives a communication from the storage system, the host may compare the current time received from the storage system and the current time according to the host's clock, and update the delta value accordingly. When the host creates a CDF and sends it to the storage system for storage, the creation date timestamp may be written into the CDF by adding the delta value to the current time specified by the host's clock, so that the creation date can be verified by the storage system based upon its own clock.

In one embodiment of the invention, before the creation date timestamp is written into the CDF, the host checks to make sure that the delta value has been checked within a reasonable period of time. For example, if the host has not received the storage system's clock within the last ten seconds, the host may directly query the storage system for its current time for use in creating the date timestamp in the CDF.

In one embodiment of the invention, the storage system may optionally verify the creation date of the CDF upon receipt of the CDF from the host, as further protection against the host attempting to spoof a false creation time for data being written. That is, the storage system may compare the creation date timestamp in the CDF to the time when the write request is received at the storage system. If the two do not match within some reasonable tolerance (e.g., ten seconds), then the storage system may deny the request to store the CDF. The tolerance can be defined in any suitable way, as this aspect of the present invention is not limited in any respect. For example, the tolerance may specify a threshold value that may not be exceeded by the difference between the CDF's creation date timestamp and the time according to the storage system clock. The tolerance may be, for example, a fixed period of time, such as ten seconds, or any other reasonable period of time. Alternatively, the tolerance may be proportional to the retention period of the CDF, so that if the retention period is small, the tolerance is also small, whereas if the retention period of the CDF is large, the tolerance can also be relatively large. Any suitable function may be used to define the relationship between the length of the retention period and the tolerance, as the invention is not limited to this respect.

As discussed above, in accordance with one embodiment of the present invention, a blob cannot be directly deleted by a host. In accordance with this embodiment, any request from a host to directly delete a blob will be rejected by the storage system. In accordance with one embodiment of the present invention, a technique is employed to identify whether a data unit stored on the storage system is a blob or a CDF, to distinguish whether a delete request is to a blob and is to be denied, or is to a CDF and may be granted subject to certain conditions discussed below. This aspect of the present invention can be implemented in any of numerous ways.

In accordance with one embodiment of the present invention, the content address for any data unit stored on the storage system includes at least one bit that is in addition to the hash generated from the content of the data unit in the manner discussed above, and the additional bit is used to identify whether the data associated with the content address is a blob or a CDF. In this manner, when the host seeks to access a unit of data, the content address provided identifies to the storage system whether the data unit is a blob or a CDF, and the storage system can use this information to process such deletion requests differently. In this respect, deletion requests directed to a blob will be denied, and deletion requests directed to a CDF will be handled in the manner discussed below in connection with FIG. 4.

In accordance with one embodiment of the present invention, the content address is generated by the storage system itself, and is returned to the host. In this respect, the storage system employs the above-described technique for generating the content address, and is a trusted source for generating such addresses authentically. By having the content address generated by the storage system, it is ensured that a host cannot spoof the storage system by, for example, falsely identifying content data (i.e., a blob) as a CDF to enable it to later be deleted directly. In this respect, one embodiment of the present invention is directed to providing a storage system that can meet with rigorous requirements for ensuring that retention policies are met, irrespective of the behavior of hosts connected thereto. An example of such an environment is to provide a storage system that complies with SEC Rule 17a-4 requirements for preserving financial records for a stated period of time.

Figure 4:
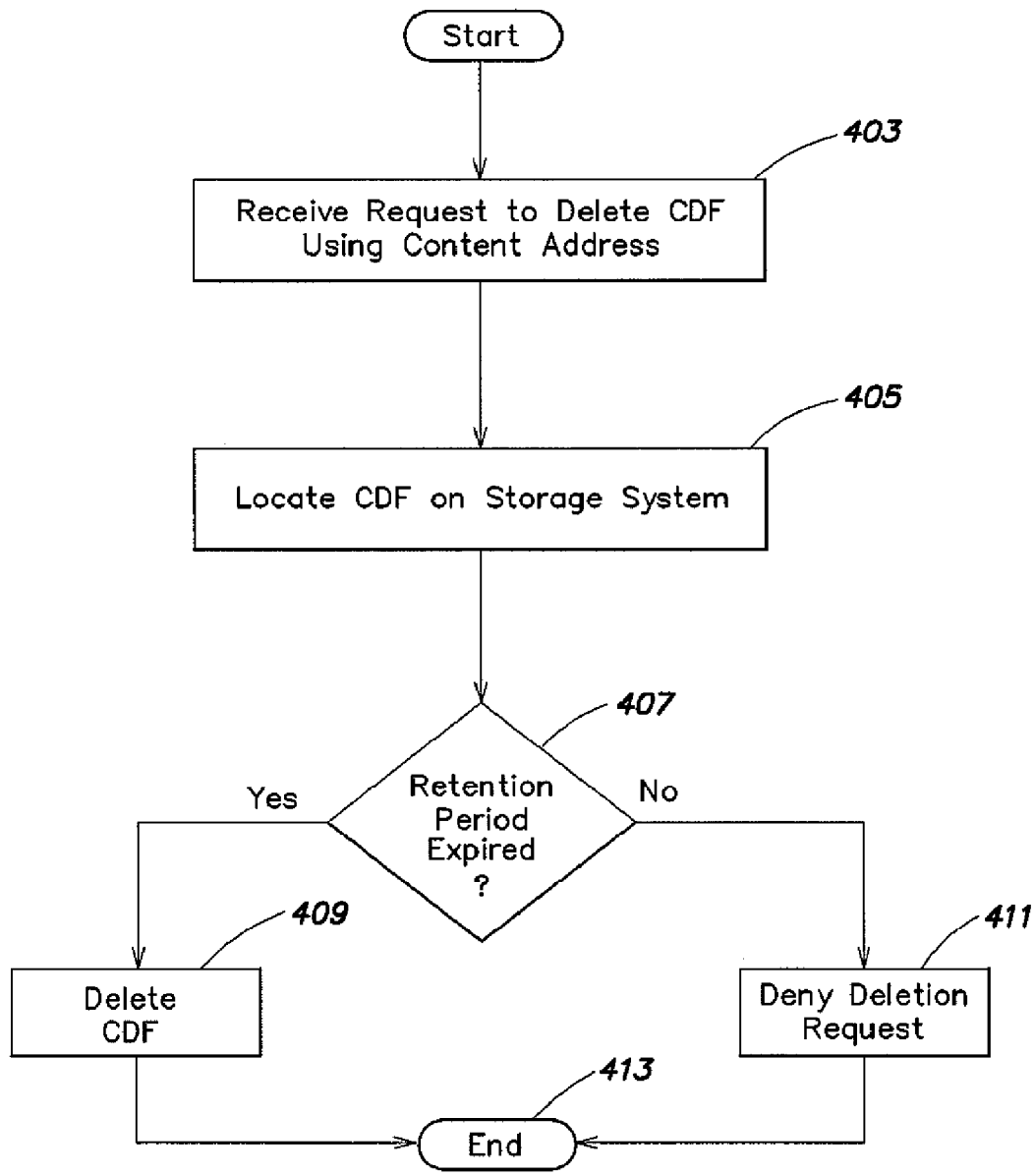
FIG. 4 is a flow chart illustrating a process by which data may deleted from a storage system, in accordance with one embodiment of the invention.

FIG. 4 is a flow chart that illustrates the process for handling a request to delete a CDF from a storage system in accordance with one embodiment of the invention. This process can be executed by the storage system itself, or by a separate computer that provides an interface between the host(s) and the storage system. The process begins in act 403 with the receipt of a request at the storage system to delete a CDF. As discussed above, the request may, for example, identify the CDF by its content address. In one embodiment of the present invention, techniques are employed to ensure that the subject of the deletion request is in fact a CDF. Those steps can be performed before initiating the process shown in FIG. 4, or alternatively, can be integrated into the process, by performing an additional verification step, and by denying the request if it is not directed to a CDF. After the request is received, the process proceeds to act 405, where the CDF is read from the storage system. The process then proceeds to act 407, where the process examines the metadata of the CDF and evaluates the retention period to determine if the retention period has expired. When the retention period has expired, the storage system deletes the CDF in act 409, and then terminates in act 413. Deletion of the CDF may be performed in several different ways, as will be discussed below in more detail. As mentioned above, deletion of the CDF may lead (indirectly) to deletion of any blobs referenced by the CDF in a manner discussed below in greater detail. When it is determined in act 407 that the retention period has not yet expired, the process denies the request to delete the CDF. The storage system may optionally return an error message to the requester (e.g., a host). The process then terminates at act 413.

Information relating to the CDFs and blobs can be stored in any suitable manner, as the present invention is not limited to any particular implementation technique. In accordance with one embodiment of the present invention, such information is stored within tables in a database suitable for use with unstructured variable length records. Each blob and CDF may have an associated table that stores, for example, the content address of the blob or CDF, the content address of any CDFs that reference (or point to) the blob or CDF, and other information, such as which physical storage location(s) (e.g., disks) store the blob or CDF, a creation timestamp, the physical location(s) for any mirrors of the blob or CDF, etc. The reference tables for a CDF need not include entries identifying which blobs the CDF points to, because the content of the CDF itself contains such information. The reference tables may include a reference count to be used in the garbage collection process. The reference count may indicate how many CDFs reference a particular blob or CDF. For example, the garbage collector may examine the reference count associated with a particular blob or CDF to determine if any CDFs reference the particular blob or CDF. If the blob or CDF is unreferenced, the garbage collector may delete it. Many other types of information may be stored in the table, as the invention is not limited in this respect. It should be appreciated that the entire table need not be stored in a single location on a single storage system, and that parts of the table may be distributed throughout different locations of one or more storage systems. Additionally, it should be understood that a single database need not be employed to store the tables for all blobs and CDFs, as any suitable configuration can be used, including one that does not employ database tables at all.

As should be appreciated from the foregoing, embodiments of the present invention can be used in systems where a CDF may point not only to blobs of data, but also to other CDFs. This architecture is useful in creating hierarchies of stored information. For example, a blob could contain an x-ray for an individual, such that a first level CDF may refer to the x-ray and identify it as belonging to a particular individual. In addition, that x-ray may also be grouped with a number of x-rays for that individual, or his family, with a higher level CDF pointing to a number of the lower level CDFs to create a logical hierarchy.

In accordance with one embodiment of the present invention, when a higher level CDF is created that points to one or more lower level CDFs, the references to the lower level CDFs are included in the content of the higher level CDF, so that the higher level CDF logically points to the lower level CDFs. In one embodiment, references to lower-level CDFs may simply be included as metadata or descriptors in the content of the higher level CDF, as the architecture does not contemplate one CDF pointing to another in the manner in which a CDF points to a blob as discussed herein (i.e., the address of the higher level CDF is not provided in the reference table for the lower level CDF). However, in an alternate embodiment of the present invention, such references can be provided so that a higher level CDF may point to a lower level CDF and have its address provided in the reference table for the lower level CDF. In accordance with this implementation, the lower level CDF cannot be deleted while it is pointed to by the higher level CDF, such that deletion of the lower level CDF will require a prior deletion of the higher level CDF.

As discussed above, in accordance with one embodiment of the present invention, a garbage collection technique is employed that deletes any blob that is not referenced by a CDF. In accordance with one embodiment of the present invention, when a blob is written to the storage system, it is written before its corresponding CDF. Thus, when the blob is written, the content address for its CDF may not yet have been generated, such that it may not be available to include as a reference in the table associated with the blob. In accordance with one embodiment of the present invention, a technique is employed to ensure that a blob written before its CDF does not appear to the garbage collection utility as an unreferenced blob, thereby leading the garbage collection utility to delete the newly written blob.

In accordance with one embodiment of the present invention, the writing of a blob and CDF is considered to constitute a transaction, and an identifier is assigned to the transaction. When the blob is written, the transaction identifier is used as a placeholder in the blob's reference table in place of the not-yet-generated content address of the CDF that will reference the blob. The garbage collection utility recognizes the placeholder and will not delete the blob. When the CDF is later written and its content address is computed, the transaction number in the blob reference table is replaced with the content address of the CDF.

It should be appreciated that the present invention is not limited to employing the above-referenced technique of providing a temporary transaction number when a blob is initially written, as other suitable techniques can be employed to ensure that the blob will not be deleted by the garbage collection utility. Furthermore, such a technique need not be employed in connection with embodiments of the present invention used in systems that do not employ a garbage collection utility, that employ a garbage collection utility that employs a different technique for determining which blobs should be deleted (rather than looking for blobs that are not referenced by any CDF), or systems that do not write blobs to the storage system before their associated CDFs.

As discussed above, one embodiment of the present invention is adapted for use with a garbage collector utility. The garbage collector may be, for example, a background process that executes on the storage system to reclaim disk space that has previously been allocated for storage, but is no longer needed (e.g., because the CDF or blob stored in that space has been marked for deletion). In one embodiment of the invention, the garbage collector searches the reference table(s) for blobs and CDFs looking for blobs or CDFs that are not referenced by any CDF. When the garbage collector finds such blobs or CDFs, the garbage collector deletes them and removes their corresponding entries from the reference table(s). It should be appreciated that when the garbage collector "deletes" a particular CDF or blob, the file that includes the CDF or blob may simply be removed from the file system of the storage system. Alternatively, in one embodiment of the invention adapted for use with applications desiring more secure deletion, the physical location(s) that stored the blob or CDF data may be overwritten with data (e.g., random bits or a specified sequence of bits) such that the actual binary data of the blob or CDF is erased or electronically "shredded" using any suitable technique.

In one embodiment of the present invention, the reference tables associated with every CDF that has not been marked for deletion has a circular reference to the CDF itself, to ensure that if the CDF is not referenced by another, the garbage collection routine will not delete it as an unreferenced CDF in the manner discussed above. It should be appreciated that the present invention is not limited in this respect, as other garbage collection techniques can be employed that do not rely on the lack of a reference from another CDF as a basis for deleting a CDF. For example, when used in accordance with the embodiment of the present invention that employs a unique identifier to differentiate between CDFs and blobs, the garbage collection utility could look to that unique identifier and recognize that unreferenced CDFs should not be deleted, whereas only unreferenced blobs should be.

As discussed above, in one embodiment of the invention, a host is not permitted to delete blobs directly. That is, any attempt to delete a blob directly (e.g., by sending a delete command to the storage system with the content address of the blob) will be denied by the storage system. This restriction is independent of the application program or utility of the host that issues the request, or the access privileges of the requester (e.g., even requests from a system administrator of the host will be denied). Thus, the host may delete blobs only by deleting all CDFs that reference the blob, and once the blob is no longer referenced by any CDFs, it will be deleted by the garbage collector.

As discussed above, in one embodiment of the invention the storage system may be able to distinguish a delete request for a blob from a delete request for a CDF. In one embodiment, when a host sends a delete request to the storage system, the host may include the content address of the data to be deleted, along with information (e.g., a boolean) that indicates whether the content address corresponds to a blob or a CDF. If the host indicates that the content address corresponds to a blob, the storage system will deny the deletion request, as direct deletion of blobs is forbidden in one embodiment of the invention. However, if the boolean indicates that the content address corresponds to a CDF, the storage system will process the request to delete the data corresponding to the content address provided by the host. Before the storage system deletes any data, the storage system checks the metadata associated with the data requested for deletion to determine if the retention period for the data has expired. In one embodiment, the storage system may find the retention period associated with a CDF in the content of the CDF itself. If the retention period has expired, the storage system may delete the CDF. If the content address provided by the host corresponds to a blob (such that the indication in the boolean that it corresponds to a CDF is erroneous), the storage system will be unable to find a retention period in the content of the blob. When no retention period is found in the content of the data to be deleted, the storage system will deny the deletion request. Thus, any request to delete a blob will fail, as the storage system will be unable to locate a retention period in the content of the blob. This prevents a host from bypassing the retention period established in a CDF by directly deleting the blob itself.

In another embodiment, the storage system may distinguish a delete request for a blob from a delete request for a CDF based on additional information added to the content address. As mentioned above, the content address may be derived from a hash of the data of the blob or CDF. The content address may include an additional identifier to indicate whether the content address is the address of a blob or a CDF. The identifier may be located anywhere within the content address. For example, when using a 26 character hash value as the content address, the identifier may be an additional character arranged such that thirteen characters of the hash value precede the identifier and thirteen characters of the hash value follow the identifier.

Deletion of a CDF and associated blob(s) may be performed in any of numerous ways. The techniques described below can be considered as alternative techniques for adoption within a given system configuration, as only one technique for deleting a CDF and its associated blob(s) may be provided. However, in accordance with one embodiment of the present invention, two or more of the below-described deletion techniques are provided on a single system (e.g., implemented by the storage system), such that the user is provided with a choice of options for performing a deletion. As is discussed in greater detail below, some methods may require a relatively small amount of initial processing and leave a relatively large amount of processing for the garbage collector, whereas others may require a relatively greater amount of initial processing but leave less work for the garbage collector (if a garbage collector is used at all). It should be appreciated that the deletion techniques described below are only performed once it is determined (e.g., in act 407 in FIG. 4) that the retention period has expired. Thus, the techniques below can be performed to implement the act of deleting the CDF at act 409 in the process of FIG. 4.

A first method is referred to as fire and forget. As mentioned above, in one embodiment, a CDF includes a circular reference to itself (e.g., stored in that CDF's entry in the reference table). In response to a request to delete the CDF, after verifying that the retention period has expired, the fire and forget method simply removes the circular reference to the CDF. So long as the CDF is not referenced by any other CDFs (in which case deletion would not be authorized), the garbage collector will eventually delete the CDF in the manner discussed above when it discovers that the CDF is now unreferenced. When the garbage collector deletes the CDF, it also searches the reference table(s) to locate any other blobs or CDFs that were referenced by the deleted CDF, and removes any of the reference table entries which identify those blobs and CDFs as being reference by the deleted CDF. This removal may result in a blob that was referenced by the CDF no longer being referenced by any CDFs, which will result in the garbage collector eventually deleting any such blob once it is discovered that the blob is unreferenced.

The fire and forget technique is initially very fast, in that the storage system does relatively little processing before responding to the host that the CDF is deleted, and leaves much of the processing for the garbage collector. A characteristic of the fire and forget technique is that when the host seeks to delete a blob by deleting its corresponding CDF, an indication returned from the storage system that the CDF has been deleted is not an indication that the corresponding blob (even if it is now unreferenced) has been deleted, as there may be some lag time for the garbage collector to search through all of the blob and CDF reference tables and delete all table entries identifying the newly deleted CDF, and to thereafter discover that a blob is now unreferenced and to delete it. As a result of this lag time, data may be read even after the deletion has been acknowledged.

A second method of deletion is referred to as asynchronous deletion. As in fire and forget, asynchronous deletion also removes the circular reference from the CDF. However, in asynchronous deletion, the CDF is then moved to a different location that indicates that the CDF has been deleted and makes the CDF no longer available to be read by the host. The new location for the CDF may be a special file system location such as a "deleted folder." It should be appreciated that the deleted CDF can be "moved" in any suitable manner, including an actual physical movement of the data associated with the CDF, by altering the file system location of the CDF or by marking the CDF with a designator indicating that it is now in the deleted folder. The garbage collector may access CDFs in the deleted folder and read the contents of those deleted CDFs to determine which CDFs and/or blobs are referenced thereby. The garbage collector may then remove any references to the deleted CDF from the reference table, and may also delete any blobs that are unreferenced as a result of those deletions.

In contrast to the fire and forget technique, the asynchronous deletion technique requires more upfront processing by the storage system (i.e., moving the CDF to the deleted folder) before the storage system returns an indication to the host that the CDF has been deleted. However, this additional upfront processing reduces the amount of processing that must be performed by the garbage collector, as the garbage collector need not search all of the CDF and blob reference tables to determine which blobs and/or CDFs were referenced by the deleted CDF, as it can gain that information directly by examining the contents of the deleted CDF in the deleted folder. As with the fire and forget technique, there may be a lag time between the host being informed that the CDF has been deleted and the resulting deletions of a blob referenced thereby, although the lag time may be less when using the asynchronous technique in view of the fact that less processing is required of the garbage collector.

A third deletion technique is referred to as synchronous deletion. In synchronous deletion, in response to a request to delete a CDF, the storage system performs the following upfront processing functions: (1) removes the CDF's circular reference; (2) deletes the CDF; (3) removes from the reference table(s) any entries that identified other blobs or CDFs as referenced by the deleted CDF; and (4) deletes any blobs that are currently unreferenced by any CDF. It should be appreciated that in accordance this embodiment of the present invention, a garbage collection routine is unnecessary, as the above-described implementation of the asynchronous deletion technique takes all actions necessary to achieve deletion, leaving no work for a garbage collection utility.

As compared to the other deletion techniques discussed above, the synchronous deletion involves relatively more upfront processing by the storage system prior to instructing the host that the deletion has been accomplished, but does not suffer from the above-referenced lag in deletion of a blob referenced by the CDF and eliminates the need for a garbage collection utility. Thus, it should be appreciated that the embodiments of the present invention described herein are not limited to the use with a garbage collection utility, as other deletion techniques are possible.

A variant on the synchronous deletion technique is that the first three of the above-referenced functions can be performed initially, prior to instructing the host that the CDF has been deleted, and the fourth step (i.e., the removal of any unreferenced blobs) can be left for a garbage collection utility.

It should be appreciated that the above-described methods of deletion are given only as examples. Many other methods of deletion may be used, as aspects of the invention are not limited to the use of any particular deletion techniques.

In one embodiment of the invention, the storage system provides the host with the ability to directly delete a blob using a purge command. The purge command allows a host to delete a blob directly, but only if the blob is not referenced by any CDFs. The restriction against deleting a blob referenced by a CDF ensures that the retention scheme of the storage system cannot be bypassed by using the purge command. Unlike the above methods of deletion in which the content address of a CDF was provided to the storage system for deletion, the purge command allows the content address of a blob to be provided directly to the storage system for deletion. By using the purge command, it is not necessary to wait for a garbage collector to delete the blob, as the blob may be deleted directly.

As discussed above, one embodiment of the present invention is directed to storage systems that meet a globally defined standard for retention, an example of which is SEC Rule 17a-4 mentioned above. Such embodiments can be referred to as defining compliant systems that comply with externally established retention policies. In one embodiment of the invention, such compliant storage systems prevent a host, system administrator or other to modify or act inconsistently with the retention policies administered by the storage system to comply with the globally-defined retention policies.

Another embodiment of the present invention is directed to systems that need not comply with any globally-defined retention policies. Such an embodiment is referred to as defining non-compliant systems. In one embodiment of the invention, non-compliant storage systems can provide an interface, in any suitable manner, that allows an administrator to define whatever user permissions and retention policies are desired. For example, a set of retention policies may be established, but a user with system administrative privileges on the host or storage system may be granted authorization to directly delete units of data in violation of the defined retention policies.

Applicants have appreciated that some populated storage systems may exist with blobs and associated CDFs that were created without the use of the retention techniques described therein, such that none of the CDFs will have retention information associated with them, and that some system users may find it desirable to upgrade such populated systems to employ the retention techniques described herein. Such an upgrade can be accomplished in any of numerous ways. For example, any pre-existing CDF without a retention period can be selected to be expired, to have an infinite retention period, or to have a retention period defined in any suitable way.

In the above examples, the retention period for a blob was stored in a CDF associated with the blob. However, it should be appreciated that the retention period may be stored within the blob itself. Further, the aspects of the present invention described herein are not limited to use in a system that employs a CDF to store metadata associated with a blob or blobs, as other techniques (e.g., storing such information within the blob itself) are possible.

It should be appreciated that the aspects of the present invention discussed above can be implemented in any of numerous ways. For example, several of the retention policies described herein are discussed as being implemented by a storage system. These aspects can be implemented on one or more storage boxes themselves that include storage devices (e.g., tape drives), or alternatively, can be implemented on a different box disposed as an interface between one or more hosts and one or more storage systems on which the data is stored. In this respect, aspects of the present invention can be implemented on any computer in the system. As used herein, the term computer is intended to cover any device that includes a processor for processing data, and can include a storage system, a network component, or any other computing device.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," or "having," "containing", "involving", and variations thereof herein, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a computer system comprising at least one host and at least one storage system, the method comprising acts of:
 (A) receiving a request, from the host, to delete a first unit of content stored on the storage system, wherein a retention period for the first unit of content is stored in the first unit of content, wherein the request identifies the first unit of content using a first content address generated, at least in part, from the retention period and at least some other content in the first unit of content such that, if the retention period is modified, a second unit of content with a second content address is generated and stored in a different location from the first unit of content;

(B) determining whether the retention period for the first unit of content has expired;

(C) when it is determined in the act (B) that the retention period for the first unit of content has not expired, denying the request to delete the first unit of content; and (D) when it is determined in the act (B) that the retention period for the first unit of content has expired, directly deleting the first unit of content in response to the request.

2. The method of claim 1, wherein the acts (A), (B) and (C) are performed by the storage system.

3. The method of claim 1, further comprising an act (D) of, prior to performing the acts (A), (B) and (C), receiving information specifying the retention period for the first unit of content.

4. The method of claim 1, further comprising acts of, prior to performing the acts (A), (B) and (C):

(D) receiving the first unit of content at the storage system; and (E) writing the first unit of content to the storage system.

5. The method of claim 4, further comprising acts of, prior to performing the acts (A), (B) and (C):

(F) receiving information specifying the retention period for the unit of content along with the first unit of content; and (G) writing the information specifying the retention period to the storage system.

6. At least one non-transitory computer readable storage medium encoded with instructions that, when executed on a computer system, perform a method for use in the computer system, wherein the computer system comprises at least one host and at least one storage system, and wherein the method comprises acts of:

(A) receiving a request, from the host, to delete a first unit of content stored on the storage system, wherein a retention period for the first unit of content is stored in the first unit of content, wherein the request identifies the first unit of content using a content address generated, at least in part, from the retention period and at least some other content in the first unit of content such that, if the retention period is modified, a second unit of content with a second content address is generated and stored in a different location from the first unit of content;

(B) determining whether the retention period for the first unit of content has expired;

(C) when it is determined in the act (B) that the retention period for the first unit of content has not expired, denying the request to delete the first unit of content; and (D) when it is determined in the act (B) that the retention period for the first unit of content has expired, directly deleting the first unit of content in response to the request.

7. The at least one non-transitory computer readable storage medium of claim 6, wherein the acts (A), (B) and (C) are performed by the storage system.

8. The at least one non-transitory computer readable storage medium of claim 6, further comprising an act (D) of, prior to performing the acts (A), (B) and (C), receiving information specifying the retention period for the first unit of content.

9. The at least one non-transitory computer readable storage medium of claim 6, further comprising acts of, prior to performing the acts (A), (B) and (C):

(D) receiving the first unit of content at the storage system; and (E) writing the first unit of content to the storage system.

10. The at least one non-transitory computer readable storage medium of claim 9, further comprising acts of, prior to performing the acts (A), (B) and (C):

(F) receiving information specifying the retention period for the first unit of content along with the first unit of content; and (G) writing the information specifying the retention period to the storage system.

11. A storage system for use in a computer system comprising at least one host and the storage system, the storage system comprising:

at least one storage device, comprising at least one physical storage medium to store data received from the at least one host; and at least one controller that:

receives a request, from the host, to delete a first unit of content stored on the storage system, wherein a retention period for the first unit of content is stored in the first unit of content, wherein the request identifies the first unit of content using a content address generated, at least in part, from the retention period such that, if the retention period is modified, a second unit of content with a second content address is generated and stored in a different location from the first unit of content;

determines whether the retention period for the unit of content has expired;

when it is determined that the retention period for the unit of content has not expired, denies the request to delete the unit of content and at least some other content in the first unit of content; and when it is determined that the retention period for the first unit of content has expired, directly deletes the first unit of content in response to the request.

12. The storage system of claim 11, wherein the at least one controller receives information specifying the retention period for the first unit of content.

13. The storage system of claim 11, wherein the at least one controller receives the first unit of content and writes the first unit of content to the at least one storage device.

14. The storage system of claim 11, wherein the at least one controller receives information specifying the retention period for the first unit of content along with the first unit of content and writes the information specifying the retention period to the at least one storage device.

15. The storage system of claim 11, wherein:

a third unit of content is stored on the storage system; and a reference to the third unit of content is stored in the first unit of content.

16. The storage system of claim 15, wherein the controller is configured not to delete the third unit of content while the reference to the third unit of content is stored in the first unit of content.

17. The storage system of claim 16, wherein:

the controller executes a garbage collector that deletes units of content that are not referenced by other units of content; and the garbage collector is configured not to delete the third unit of content while the reference to the third unit of content is stored in the first unit of content.

18. The storage system of claim 15, wherein the controller denies every request from the host to delete the third unit of content.

19. The storage system of claim 15, wherein:
the retention period is a first retention period;
a fourth unit of content is stored on the storage system, wherein a second retention period for the fourth unit of content is stored in the fourth unit of content; and
a reference to the third unit of content is stored in the fourth unit of content.

20. The storage system of claim 11, wherein:
the first unit of content is a content descriptor file; and
one or more references to blobs are stored in the content descriptor file.

\* \* \* \* \*